United States Patent [19]

Baker

[11] 4,310,828
[45] Jan. 12, 1982

[54] PROGRAMMED CONTROLLER

[75] Inventor: Garland W. Baker, Austin, Tex.

[73] Assignee: Esquire, Inc., New York, N.Y.

[21] Appl. No.: 108,872

[22] Filed: Dec. 31, 1979

[51] Int. Cl.³ .............................................. H04Q 3/00
[52] U.S. Cl. ............................ 340/825.22; 340/825.65
[58] Field of Search ............... 340/147 P, 348, 168 R, 340/167 R; 328/28, 30, 32

[56] References Cited

PUBLICATIONS

Electronics Australia, Aug. 1977, "Test Message Generator for Data Terminals", Edwards.

Primary Examiner—Harold I. Pitts
Attorney, Agent, or Firm—Frank S. Vaden, III; Emil J. Bednar

[57] ABSTRACT

An electronic controller for providing one or more sequences of control outputs for a plurality of controlled devices. The controller includes a pulser which produces pulses at the rate of the frequency of an ac source, a divider for producing spaced pulses preferably at one-second intervals, a counter for counting a large number of these spaced pulses and one or more PROM's. The PROM's select and actuate one or more sequences stored therein and produce controlling outputs on a plurality of lines to a plurality of controlled devices.

12 Claims, 1 Drawing Figure

PROGRAMMED CONTROLLER

BACKGROUND OF THE INVENTION

1. Field of the Invention

This invention relates to control devices and more particularly to electronic controllers having universal application for operating in a programmable sequence such things as lights, motors and the like.

2. Description of the Prior Art

It is often desirable to be able to automatically operate a plurality of electronically operated switches through one or more programmable sequences to achieve a desirable overall operating effect. For example, many fountains have a plurality of water jetting actions which it can perform. In addition, these fountains commonly have a plurality of lights that can be turned on or off to achieve different visual lighting effects, both with respect to color as well as providing illumination to various physical parts of the fountain, or to provide light intensity or direction to variously artistically display the fountain as it operates through its water jetting sequence.

Timers have been provided with cams for closing and opening switches to provide programmed sequencing. Improvements have included timers driving electronic switches for achieving the same effect as the timers with mechanical cams. In either event, the set sequence, once determined, has not been easy to change. Moreover, the number of steps in the sequence has not been easy to increase or to subtract from and the number of outputs provided to individual devices to be controlled has been limited with no convenient way provided for expanding such number.

Therefore, it is a feature of the present invention to provide an improved electronic controller not relying on a timer for sequencing a plurality of electronic devices.

It is another feature of the present invention to provide an improved electronic controller in which the steps in the sequence are readily increased or decreased.

It is yet another feature of the present invention to provide an improved electronic controller in which the number of outputs to controlled devices is readily changeable.

SUMMARY OF THE INVENTION

The illustrated embodiment of the present invention converts source ac voltage into regular pulses at a rate equal to the frequency of the source. These pulses are then subsequently divided to provide a regular voltage pulsing at relatively long intervals, preferably at one per second. These pulses, nominally spaced at one second intervals, are then counted in a binary counter, producing a binary up count output on multiple-line address outputs. In a preferred embodiment, there are eight address lines, so there are 256 distinctively coded outputs. These outputs are detected by one or more programmable read only memory (PROM) devices for providing a plurality of outputs to the controlled devices in accordance with the program established in the PROM. One of the outputs from the PROM can be a reset output for the counters or for a flip-flop that provides a reset output to the counters.

BRIEF DESCRIPTION OF THE DRAWING

So that the manner in which the above-recited features, advantages and objects of the invention, as well as others which will become apparent, are attained and can be understood in detail, more particular description of the invention briefly summarized above may be had by reference to the embodiment thereof which is illustrated in the drawing, which drawing forms a part of this specification. It is to be noted, however, that the appended drawing illustrates only a typical embodiment of the invention and is therefore not to be considered limiting of its scope for the invention may admit to other equally effective embodiments.

In the Drawing

Figure 1:
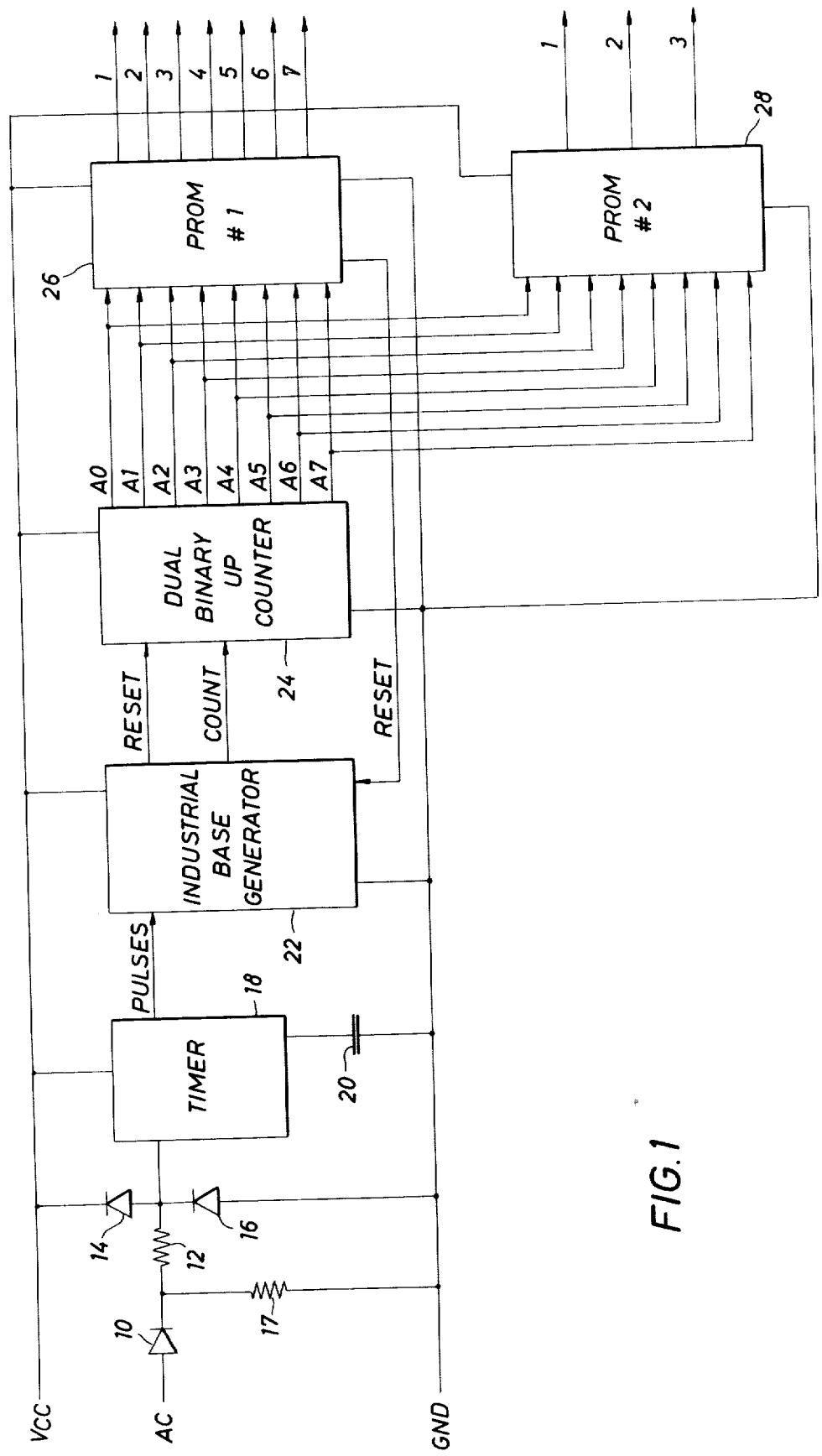

The FIGURE is a simplified schematic diagram and block diagram of a preferred embodiment of the present invention.

DESCRIPTION OF THE PREFERRED EMBODIMENT

The drawing illustrates in simplified form a preferred embodiment of the electronic controller in accordance with the present invention.

The ac source that is applied to a diode 10 is derived from an ac line via transformer action and is nominally in the amplitude range of 8–10 volts. The $V_{cc}$ voltage for biasing the components in the circuit is nominally set at 5 volts. Diode 10 operates as a half-wave rectifier producing positive-going pulses through current limiting resistor 12 to the junction point between diodes 14 and 16. The cathode of diode 14 is connected to the $V_{cc}$ line and the anode of diode 16 is connected to ground. The cathode of diode 16 is connected to the anode of diode 14 at the junction point.

Resistor 17 connected between the cathode of diode 10 and ground assures that the value of the voltage in each half cycle is below the voltage necessary to trigger timer 18 connected to the output between diodes 14 and 16. Diodes 14 and 16 operate as clamps to assure that the voltage to timer 18 is between 0 and 5 volts.

Timer 18 is preferably a standard Model 555 timer. A description of such a timer is set forth in U.S. Pat. No. 4,170,747, commonly assigned, which is incorporated herein by reference. Essentially, the timer functions with diode 10 is an ac-to-digital pulse conversion means since for each half-cycle, rectified wave the timer produces an output. The pulse duration is determined by the internal components and external capacitor 20 which are parts of a time constant network controlling the output pulse width.

The pulses from timer 18 are supplied at a rate equal to the frequency of the ac source. That is, for a standard 60 Hz source, the pulses are at 60 pulses per second and for a standard 50 Hz source the pulses are at 50 pulses per second. These pulses are supplied to industrial base generator 22 operating as a divider means. Generator 22 is preferably a Motorola MC 14566B industrial time base generator constructed with MOS P-channel and N-channel enhancement mode devices in a single monolithic structure. This device comprises a divide-by-10 ripple counter and a divide-by-5 or a divide-by-6 ripple counter so as to permit a 1.0 Hz output regardless of whether the input is at 50 Hz or at 60 Hz.

For convenience, when such a device is used, the input is applied to pin 15, $V_{cc}$ is applied to pin 16, ground is connected to pins 2, 8, 9, and 11, pins 1 and 14 are externally connected together and the output is on pin 6. As will be explained below, pins 7 and 10 can be used for reset purposes.

The pulses from the divider means just described may conveniently be at some other spacing, but they are preferably conveniently spaced at one second intervals, as above described.

A counter 24, preferably in the form of Motorola Model MC 14520B Dual Binary Up Counter, accepts the pulses from generator 22 and produces a binary output on eight address lines A0–A7. Hence, for this preferred circuit, there is a maximum counting capacity of 256 seconds (eight address lines with codes equal $2^8$). Hence, such a counter provides individual sequence outputting from 0–255.

The MC 14520B counter is constructed with MOS P-channel and N-channel enhancement mode devices in a single monolithic structure. The counter includes two identical, internally synchronous 4-stage counters. The counter stages are type D flip-flops, with interchangeable Clock and Enable lines for incrementing on either the positive-going transition (the preferred operation for the application described herein) or the negative-going transition as required for cascading multiple stages.

For convenience, the following connections apply: $V_{cc}$ to pin 16; ground to pins 1, 8 and 9; input to pin 2; outputs A0–A7 respectively to pins 3, 4, 5, 6 (and 10), 11, 12, 13 and 14; and reset to pins 7 and 15.

The address lines of the counter are connected to one or more programmable read only memory (PROM) devices 26 and 28. There are numerous PROM devices that are known which operate almost equally well. Some of these are the Motorola Models MCM 7641 (seven outputs), MCM 7621 (three outputs), MCM 2708/27A08 (erasable memory, seven outputs), Harris HM-7680P/81P (4 sequences, seven outputs), and INTEL EPROM Model 2708 or 2716 (erasable PROM).

In operation, the PROM is internally programmed so that the desired sequence of events produces the desired outputs for activating the devices connected respectively to the output lines. Simple PROM's may include only one sequence. However, other PROM's, such as the Harris model identified above, may have multiple sequences programmed therein. Operation in accordance with such a PROM would cause a first sequence to occur the first time counter 24 ran through its count and a different sequence to occur the next time counter 24 ran through its count and so forth within the sequence capacity of the PROM.

Although illustrated with connections to two PROM's, namely, PROM 26 and PROM 28, it should be noted that operation can be only with respect to a single PROM or in connection with more than two similarly connected to the output lines from counter 24.

Also, switches can be provided to select first one PROM and then another and timers can be provided for cutting on and off either a part of or the entire circuit described above, such as during daylight hours when the controller is connected for sequencing lights at night.

The only additional items required to provide a complete drive circuit for a given application, in addition to the controller just described, would be the driver circuit for operating the relays, contractors, triacs or other outputting devices connected to the output of the PROM's.

Reprogramming can be readily accommodated by either replacing the PROM's or by reprogramming the PROM's.

Resetting of the counter can be directly from one of the outputs from the PROM, or delayed, or directly through the use of a flip-flop. The preferred model of counter 24 described above includes a separate flip-flop useful for this purpose. The reset input can be applied at pin 7 and the output is taken from pin 10.

While a particular embodiment of the invention has been shown and described, it will be understood that the invention is not limited thereto, since modifications may be made and will become apparent to those skilled in the art. For example, the output from the counter is described as being binary. They could be binary-decimal coded (BCD) outputs provided the PROM's accepted such outputs.

What is claimed is:

1. An electronic controller, comprising
    ac-to-digital pulse conversion means connectable to an ac source for producing pulses at regular intervals dependent upon the frequency of the source,
    divider means for dividing the output from said conversion means to produce pulses at a long division of the pulse rate from said conversion means,
    counter means connected to said divider means so that each count produces a sequentially coded output on multiple-line address outputs related to said count, and
    a PROM programmed for producing a plurality of control operations sequenced by the multiple-line address outputs from said counter means.

2. An electronic controller in accordance with claim 1, wherein said conversion means includes a half wave rectifier and timer means for assuring that the conversion means produces one pulse per cycle of the ac source.

3. An electronic controller in accordance with claim 1, wherein said divider means divides the output of said conversion means to produce pulses at one second intervals.

4. An electronic controller in accordance with claim 1, wherein said counter means includes means for producing a binary output.

5. An electronic controller in accordance with claim 4, wherein said counter means produces its binary output on 8 address lines, thereby having a count output capacity from 0–255.

6. An electronic controller in accordance with claim 1, wherein said PROM is reprogrammable.

7. An electronic controller in accordance with claim 1, wherein said PROM is replaceable.

8. An electronic controller in accordance with claim 1, wherein said PROM includes a reset output for resetting said counter means.

9. An electronic controller in accordance with claim 8, wherein said divider means includes a flip-flop actuated by said reset output for subsequently resetting said counter means.

10. An electronic controller in accordance with claim 1, and including a second PROM connected to said counter means for producing additional control operations concurrently with the control operations from said first-named PROM.

11. An electronic controller in accordance with claim 1, and wherein said PROM is programmed for more than one sequence of a plurality of control operations.

12. An electronic controller in accordance with claim 1, and including a timer for supplying control operations for a predetermined period of time.

* * * * *